(12) United States Patent
Thomas et al.

(10) Patent No.: US 8,646,476 B2
(45) Date of Patent: Feb. 11, 2014

(54) INTEGRATED KITCHEN FAUCET SIDE SPRAY AND DIVERTER

(75) Inventors: Kurt J. Thomas, Indianapolis, IN (US); Derek A. Brown, Lizton, IN (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 369 days.

(21) Appl. No.: 12/992,442

(22) PCT Filed: May 21, 2009

(86) PCT No.: PCT/US2009/044850
§ 371 (c)(1),
(2), (4) Date: Nov. 12, 2010

(87) PCT Pub. No.: WO2009/143352
PCT Pub. Date: Nov. 26, 2009

(65) Prior Publication Data
US 2011/0061754 A1    Mar. 17, 2011

Related U.S. Application Data

(60) Provisional application No. 61/128,463, filed on May 21, 2008.

(51) Int. Cl.
  *G05D 11/00*   (2006.01)
  *F16K 11/20*   (2006.01)
(52) U.S. Cl.
  USPC ...................................... 137/119.04; 137/597
(58) Field of Classification Search
  USPC ................ 137/119.04, 119.03, 119.01, 597
  See application file for complete search history.

(56) References Cited

U.S. PATENT DOCUMENTS

| | | |
|---|---|---|
| 3,336,935 A | 8/1967 | Ward et al. |
| 3,459,207 A | 8/1969 | Bacheller |
| 3,520,325 A | 7/1970 | Stuart |
| 3,600,723 A | 8/1971 | Mongerson et al. |
| 3,620,254 A | 11/1971 | Mongerson et al. |
| 3,757,824 A | 9/1973 | Parkhurst |
| 3,796,380 A | 3/1974 | Johnson et al. |
| 3,835,887 A | 9/1974 | Mongerson et al. |
| 3,998,240 A | 12/1976 | Liautaud |
| 4,026,328 A | 5/1977 | Nelson |
| 4,076,279 A | 2/1978 | Klotz et al. |

(Continued)

FOREIGN PATENT DOCUMENTS

| | | |
|---|---|---|
| CN | 2823722 | 10/2006 |
| DE | 10133041 | 1/2003 |

(Continued)

OTHER PUBLICATIONS

International Search Report and Written Opinion for PCT Application No. PCT/US2009/044850, issued Jul. 14, 2009, 11 pgs.

(Continued)

*Primary Examiner* — John K Fristoe, Jr.
*Assistant Examiner* — Michael R Reid
(74) *Attorney, Agent, or Firm* — Faegre Baker Daniels LLP

(57) ABSTRACT

A diverter assembly (12) for use with a faucet assembly (10) including a diverter valve (78) secured to an inlet end (80) of a sprayer tube (46) and removably received within a connector (62).

10 Claims, 18 Drawing Sheets

(56) References Cited

U.S. PATENT DOCUMENTS

| | | | |
|---|---|---|---|
| 4,103,709 | A | 8/1978 | Fischer |
| 4,337,795 | A | 7/1982 | Argyris et al. |
| 4,356,574 | A | 11/1982 | Johnson |
| 4,387,738 | A | 6/1983 | Bisonaya et al. |
| 4,458,839 | A | 7/1984 | MacDonald |
| 4,513,769 | A | 4/1985 | Purcell |
| 4,552,171 | A | 11/1985 | Farrell et al. |
| 4,577,653 | A | 3/1986 | Marty |
| 4,607,659 | A | 8/1986 | Cole |
| 4,609,006 | A * | 9/1986 | Parkison et al. ......... 137/119.04 |
| 4,610,429 | A | 9/1986 | Arnold et al. |
| 4,626,005 | A | 12/1986 | Stifter |
| 4,635,673 | A | 1/1987 | Gerdes |
| 4,649,958 | A | 3/1987 | Purcell |
| 4,754,993 | A | 7/1988 | Kraynick |
| 4,760,871 | A | 8/1988 | Vijay |
| 4,762,143 | A | 8/1988 | Botnick |
| 4,798,221 | A | 1/1989 | Crawford et al. |
| 5,027,851 | A | 7/1991 | Drees et al. |
| 5,073,991 | A | 12/1991 | Marty |
| 5,090,062 | A | 2/1992 | Hochstrasser |
| 5,095,554 | A | 3/1992 | Gloor |
| 5,100,565 | A | 3/1992 | Fujiwara et al. |
| 5,131,428 | A | 7/1992 | Bory |
| 5,219,185 | A | 6/1993 | Oddenino |
| 5,494,259 | A | 2/1996 | Peterson |
| 5,558,128 | A | 9/1996 | Pawelzik et al. |
| 5,566,707 | A | 10/1996 | Ching et al. |
| 5,573,037 | A | 11/1996 | Cole et al. |
| 5,642,755 | A | 7/1997 | Mark et al. |
| 5,653,868 | A | 8/1997 | Yanou et al. |
| 5,669,417 | A | 9/1997 | Lian-Jie |
| 5,685,341 | A | 11/1997 | Chrysler et al. |
| 5,687,952 | A | 11/1997 | Arnold et al. |
| 5,701,926 | A | 12/1997 | Luisi |
| 5,725,008 | A | 3/1998 | Johnson |
| 5,746,244 | A | 5/1998 | Woolley, Sr. et al. |
| 5,803,120 | A | 9/1998 | Bertoli |
| 5,865,473 | A | 2/1999 | Semchuck et al. |
| 5,871,029 | A | 2/1999 | Peteri et al. |
| 5,881,754 | A | 3/1999 | Wei |
| 5,884,662 | A | 3/1999 | Ko |
| 5,937,892 | A | 8/1999 | Meisner et al. |
| 5,944,225 | A | 8/1999 | Kawolics |
| 5,950,663 | A | 9/1999 | Bloomfield |
| 5,960,490 | A | 10/1999 | Pitsch |
| 5,979,489 | A | 11/1999 | Pitsch |
| 6,023,796 | A | 2/2000 | Pitsch |
| 6,062,251 | A | 5/2000 | Pitsch |
| 6,070,614 | A | 6/2000 | Holzheimer et al. |
| 6,073,972 | A | 6/2000 | Rivera |
| 6,079,447 | A | 6/2000 | Holzheimer et al. |
| 6,085,784 | A | 7/2000 | Bloom et al. |
| 6,123,106 | A | 9/2000 | Benstead |
| 6,138,296 | A | 10/2000 | Baker |
| 6,202,686 | B1 | 3/2001 | Pitsch et al. |
| 6,256,810 | B1 | 7/2001 | Baker |
| 6,305,407 | B1 | 10/2001 | Selby |
| 6,328,059 | B1 | 12/2001 | Testori et al. |
| 6,609,732 | B1 | 8/2003 | Souvatzidis et al. |
| 6,729,344 | B1 | 5/2004 | Hung |
| 6,757,921 | B2 | 7/2004 | Esche |
| 6,920,892 | B2 | 7/2005 | Agresta et al. |
| 7,000,854 | B2 | 2/2006 | Malek et al. |
| 7,077,153 | B2 * | 7/2006 | Segien, Jr. ................ 137/119.01 |
| 7,096,879 | B2 | 8/2006 | Yardley |
| 7,121,303 | B1 | 10/2006 | Hwang |
| 7,216,663 | B2 * | 5/2007 | Vu ........................... 137/119.04 |
| 7,721,761 | B2 * | 5/2010 | Thomas ...................... 137/597 |
| 2002/0167171 | A1 | 11/2002 | Becker et al. |
| 2003/0102256 | A1 | 6/2003 | Takagi |
| 2004/0011399 | A1 | 1/2004 | Segien, Jr. |
| 2004/0117906 | A1 | 6/2004 | Baker et al. |
| 2006/0117477 | A1 | 6/2006 | Rosko |
| 2006/0131228 | A1 | 6/2006 | Truong |
| 2008/0178935 | A1 | 7/2008 | Thomas |

FOREIGN PATENT DOCUMENTS

| | | |
|---|---|---|
| EP | 0632220 | 1/1995 |
| EP | 0808952 | 11/1997 |
| WO | WO 91/05191 | 4/1991 |
| WO | WO 02/25022 | 3/2002 |

OTHER PUBLICATIONS

Price Pfister 526 Series Hanover™ Collection Pull-Out Kitchen Faucet Parts Explosion, Sep. 15, 2006, 1 pg.

Price Pfister 526 Series Hanover™ Collection Pull-Out Kitchen Faucet Specification Submittal, Sep. 19, 2006, 1 pg.

Price Pfister Kitchen Hanover™ Collection options, 1 pg., at least as early as Nov. 12, 2010.

* cited by examiner

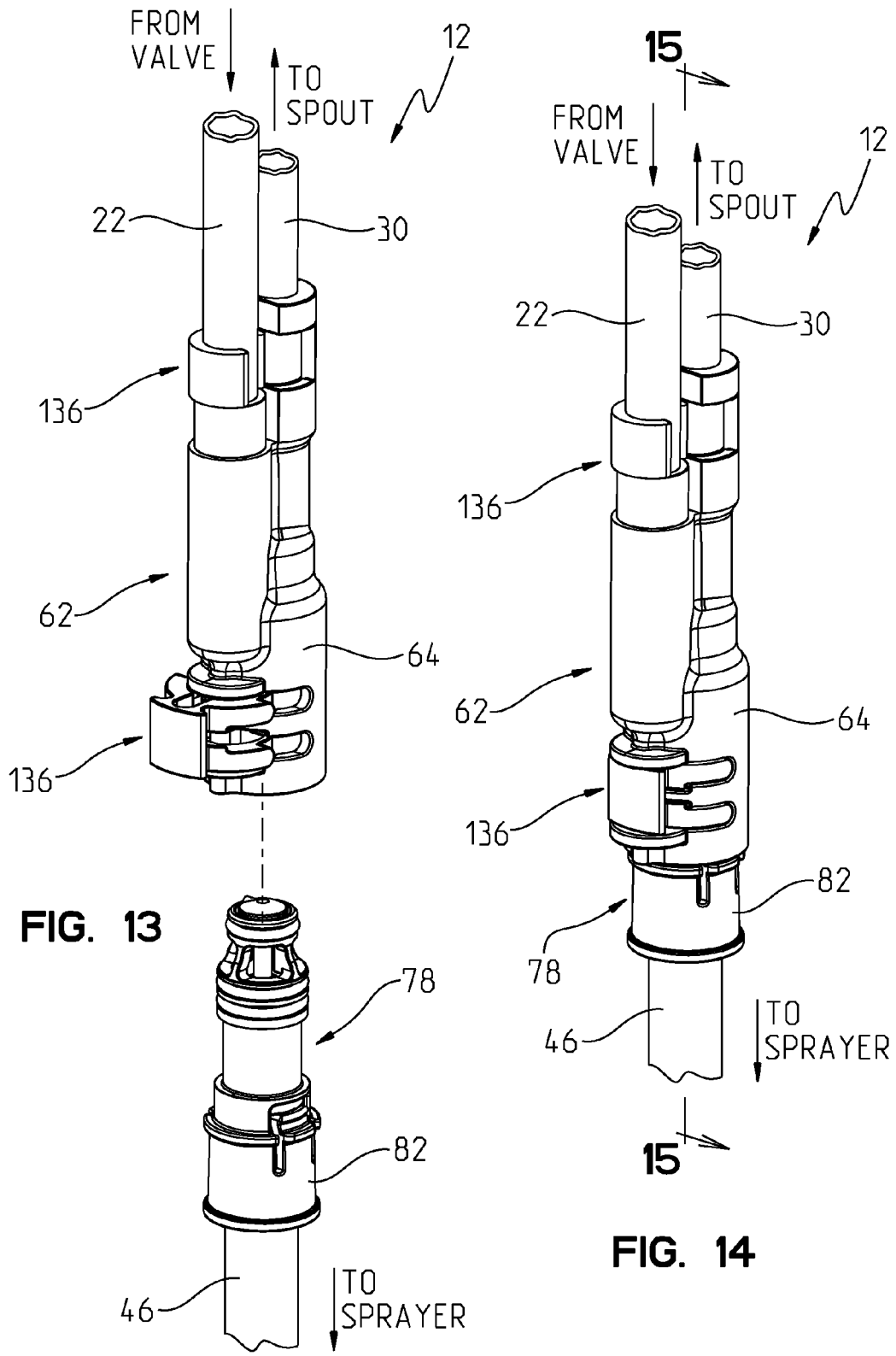

INTEGRATED KITCHEN FAUCET SIDE SPRAY AND DIVERTER

CROSS-REFERENCE TO RELATED APPLICATION

This application is a national phase filing of PCT International Application Serial No. PCT/US2009/044850, filed May 21, 2009, which claims the benefit of U.S. Provisional Patent Application Ser. No. 61/128,463, filed May 21, 2008, the disclosures of which are expressly incorporated herein by reference.

BACKGROUND AND SUMMARY OF THE INVENTION

The present invention relates to diverters for use with faucets, and more particularly, to a diverter configured to be positioned below the mounting deck of a sink. The disclosure of U.S. provisional patent application Ser. No. 61/128,403, filed May 21, 2008, is expressly incorporated by reference herein.

A diverter valve is often used in conjunction with a kitchen faucet including a delivery spout and a side sprayer. The sprayer is typically connected to a flexible hose that can be moved in various orientations relative to a sink basin. The sprayer may be activated by pressing a button or trigger that opens a poppet valve located inside the sprayer. When the sprayer is activated, water flow to the sprayer causes a pressure drop across a diverter seal which, in turn, stops water flow to the spout. Generally, this diverter valve is located in the valve body or faucet spout supported above the sink deck.

The present disclosure provides a diverter assembly configured to be connected to a faucet assembly that may be installed on a sink deck. The diverter assembly includes a diverter and an auxiliary fluid dispenser, such as a side sprayer or a filtered water dispenser. The diverter assembly is illustratively coupled to a tube which, in turn, is coupled to the delivery spout outlet of the faucet. The diverter assembly may redirect flow from the delivery spout outlet of the faucet to the auxiliary fluid dispenser upon activation of the auxiliary fluid dispenser.

In an illustrative embodiment of the present disclosure, a sprayer tube is attached directly to a diverter housing. The diverter housing is illustratively asymmetric to facilitate passage through a deck mounting shank. The outlet tube for the spout illustratively has a connector housing molded onto the end thereof and is configured to receive the diverter housing. The connector housing is also configured to receive the inlet tube from the faucet valve. A sealing plug may replace the diverter housing of the sprayer tube within the connector housing when a non-sprayer type faucet (i.e. no diverter valve) is desired. Both the plug and the diverter housing use the same coupler to secure them to the connector housing.

In a further illustrative embodiment of the present disclosure, a diverter assembly for a faucet includes a connector housing having an inlet passage configured to be fluidly coupled to water supply, a first outlet passage configured to be fluidly coupled to a first water delivery device, and a second outlet passage configured to be fluidly coupled to a second water delivery device. A diverter valve is removably coupled to the connector housing. The diverter valve includes a diverter housing slidably received within the second outlet passage of the connector housing, and a valve member supported by the diverter housing. The diverter housing includes an inlet port in fluid communication with the inlet passage of the connector housing, a first outlet port in fluid communication with the first outlet passage of the connector housing, and a second outlet port in fluid communication with the second outlet passage of the connector housing. The valve member includes a first mode of operation for blocking water flow through the second outlet port and permitting water flow through the first outlet port, and a second mode of operation for permitting water flow through the second outlet port and blocking water flow through the first outlet port. A coupler is supported by the connector housing and is configured to secure the diverter housing to the connector housing.

According to another illustrative embodiment of the present disclosure, a diverter assembly for a faucet includes a connector housing having an inlet passage, a first outlet passage, and a second outlet passage. A spout outlet tube includes an end coupled to the first outlet passage of the connector housing. A diverter valve is configured to be removably coupled to the second outlet passage of the connector housing in a multiple water outlet configuration, wherein water is configured to alternatively flow through the first outlet passage and the second outlet passage of the connector housing. The diverter valve includes a diverter housing and a valve member supported by the diverter housing. The diverter housing includes an inlet port in fluid communication with the inlet passage, a first outlet port in selective fluid communication with the inlet port, and a second outlet port in selective fluid communication with the inlet port. The valve member is configured to control water flow from the inlet port to the first and second outlet ports. A plug is configured to be removably coupled to the second outlet passage of the connector housing in a single water outlet configuration, wherein water is prevented from flowing through the second outlet passage.

In a further illustrative embodiment of the present disclosure, a faucet includes a control valve fluidly coupled to a water supply, an inlet tube including opposing first and second ends, the first end fluidly coupled to the control valve, and a connector housing. The connector housing includes an inlet passage, a first outlet passage, and a second outlet passage, the second end of the inlet tube being coupled to the inlet passage. A spout outlet tube includes opposing first and second ends, the first end coupled to the first outlet passage of the connector housing, and the second end defining a water outlet above a sink. A sprayer assembly includes a sprayer outlet tube having opposing first and second ends, a diverter valve coupled to the first end, and a handheld sprayer coupled to the second end. The diverter valve includes a diverter housing fixed to the first end of the dispenser outlet tube, and a valve member supported by the diverter housing. A plug is interchangeable with the diverter valve, wherein the diverter valve is coupled to the second outlet passage of the connector housing in a multiple outlet configuration and the plug is coupled to the second outlet passage of the connector housing in a single water outlet configuration.

According to yet another illustrative embodiment of the present disclosure, a method of coupling a dispenser assembly to a faucet includes the steps of providing a connector including an inlet passage, a first outlet passage, and a second outlet passage, and providing an inlet tube including an end coupled to the inlet passage of the connector. The method further includes the steps of providing a spout outlet tube including an end coupled to the first outlet passage of the connector, uncoupling a sealing plug from the second outlet passage of the connector, and providing an auxiliary dispenser including a diverter valve, the diverter valve having a diverter housing and a valve member supported by the diverter housing. The method also includes the steps of coupling the diverter housing to the second outlet passage of the connector, and securing the diverter housing to the connector.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 13 is a perspective view similar to FIG. 12, showing the diverter valve positioned for receipt within the second outlet passage of the connector;

FIG. 14 is a perspective view similar to FIG. 13, showing the diverter valve received within the second outlet passage of the connector;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
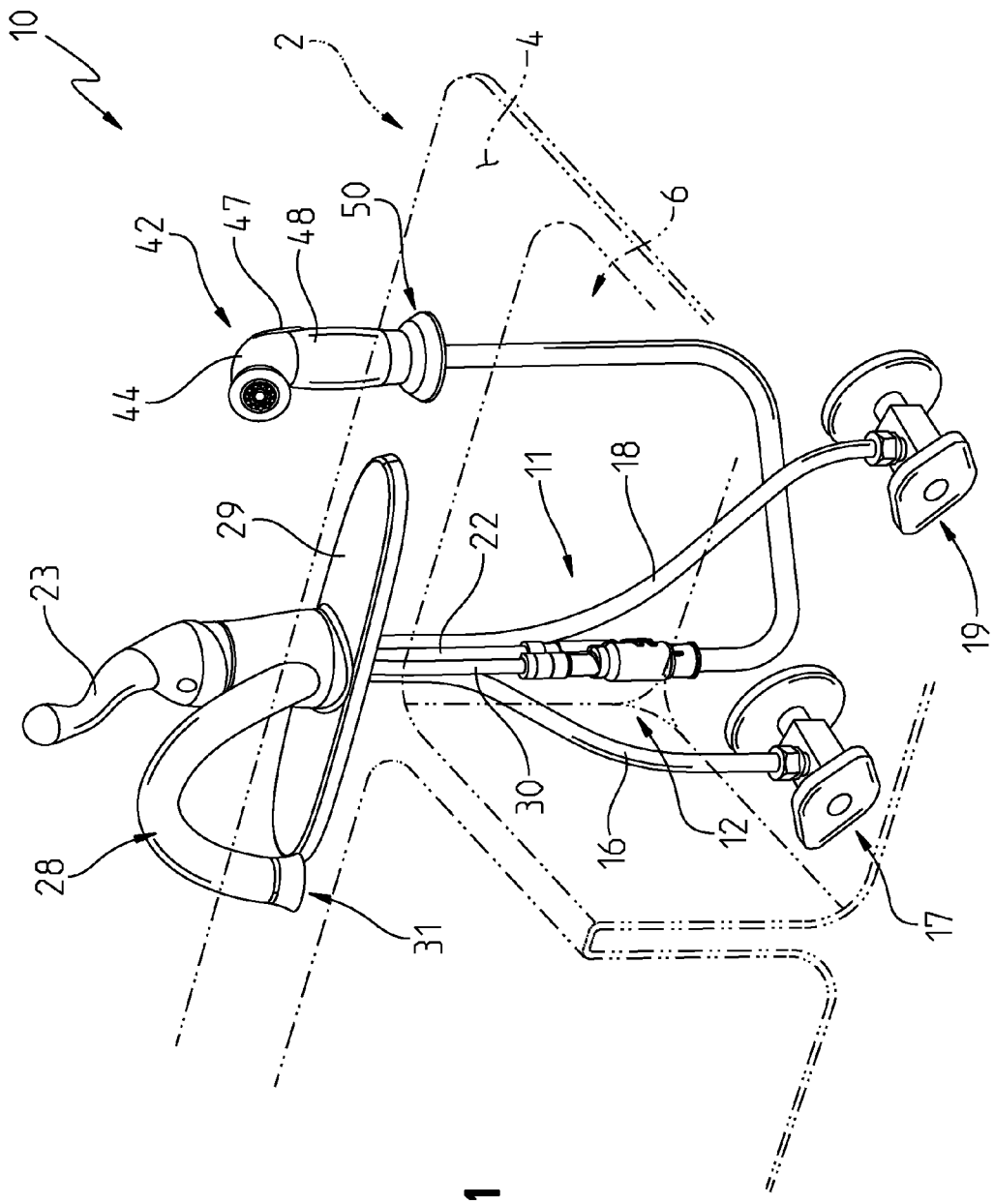
FIG. 1 is a perspective view of a faucet supported by a sink and including the illustrative diverter assembly of the present disclosure.
Figure 2:
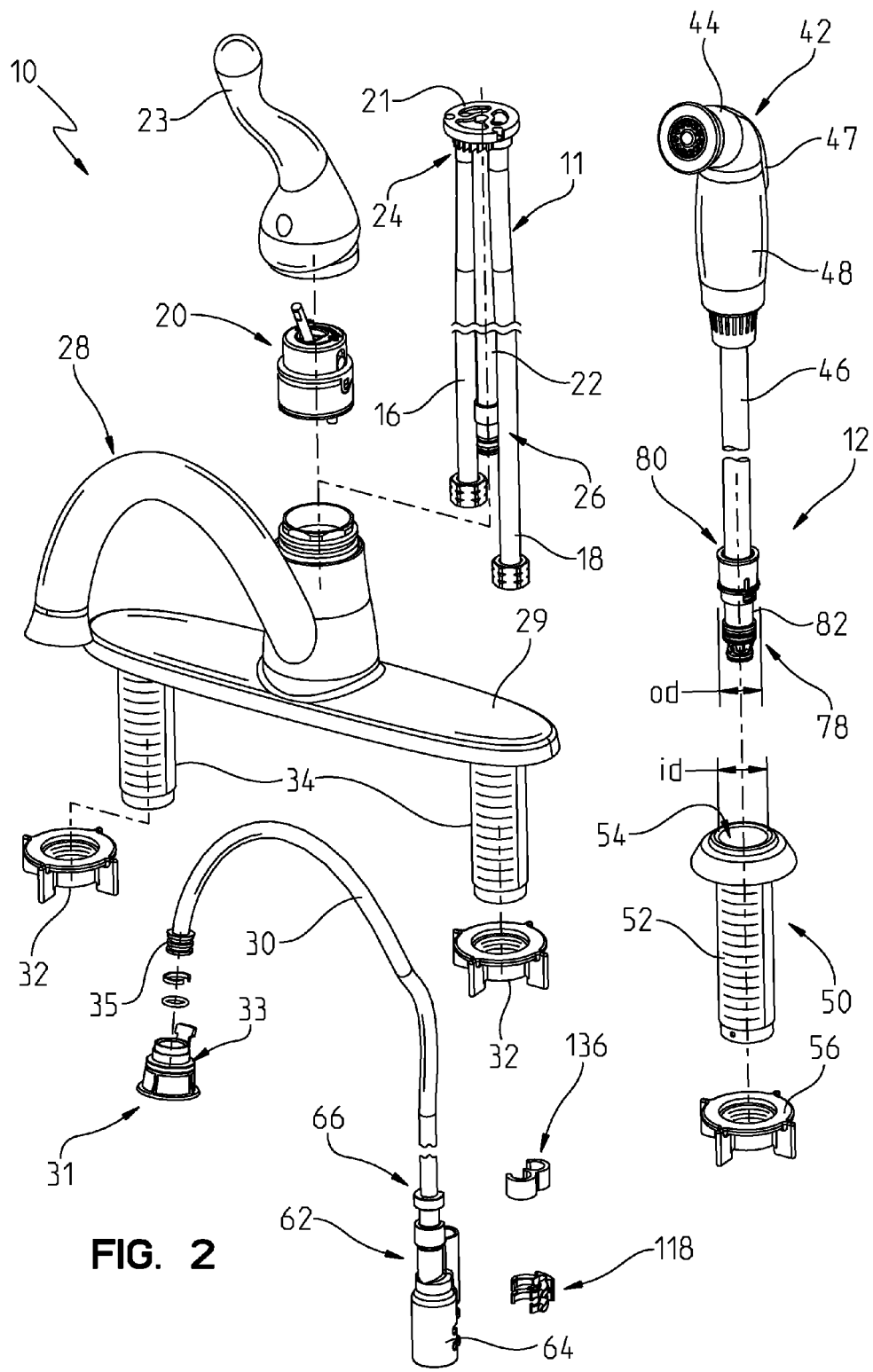
FIG. 2 is an exploded perspective view of the faucet of FIG. 1.

Referring initially to FIG. 1, a sink assembly 2 is shown as including a sink or mounting deck 4 supporting an illustrative faucet assembly 10 above a sink basin 6. The faucet assembly 10 is shown as including the diverter assembly 12 of the present disclosure. As shown in FIG. 2, the faucet assembly 10 includes a waterway assembly 11 having a hot water supply line or tube 16 and a cold water supply line or tube 18 configured to supply water to a control or mixing valve 20 through a valve interface member 21. More particularly, the hot water supply tube 16 is fluidly connected to a hot water supply valve or stop 17, while the cold water supply tube 18 is fluidly connected to a cold water supply valve or stop 19. Operation of the mixing valve 20 regulates the flow of water from the hot water supply tube 16 and the cold water supply tube 18 to a mixed water line or inlet tube 22. A user input, illustratively a handle 23, is operably coupled to the mixing valve 20 to control the flow rate and the temperature of water delivered to the mixed water inlet tube 22.

The mixed water inlet tube 22 includes an inlet end 24 and an outlet end 26. The faucet assembly 10 includes a delivery spout 28 supported by a base 29 and configured to receive a spout outlet tube 30 having an outlet 31 positioned above the sink basin 6 and configured to discharge water from the mixed water inlet tube 22. The outlet 31 may be defined by an aerator 33 coupled to an overmolded end fitting 35 of the spout outlet tube 30. Illustratively, the base 29 may be secured to the mounting deck 4 through nuts 32 threadably engaging mounting shanks or posts 34. In the illustrative embodiment, the hot water supply tube 16, the cold water supply tube 18, the mixed water inlet tube 22, the spout outlet tube 30, and the valve interface member 21 are all formed of a polymer, such as a cross-liked polyethylene (PEX).

An auxiliary fluid dispenser, illustratively a sprayer assembly 42 includes a handheld sprayer 44 fluidly coupled to a dispenser or sprayer outlet tube 46. The sprayer 44 may be of conventional design and includes a trigger 47 configured to activate water flow therethrough. The sprayer 44 includes a body 48 configured to be removably supported by a mounting base 50. The mounting base 50 includes a mounting shank or post 52 defining a passageway 54 to slidably receive the sprayer outlet tube 46. A nut 56 threadably engages the mounting post 52 and secures the mounting base 50 to the mounting deck 4. While the illustrative auxiliary fluid dispenser is shown as comprising sprayer assembly 42, it should be noted that other fluid delivery devices may be substituted therefore, including a filtered water dispenser.

Figure 3:
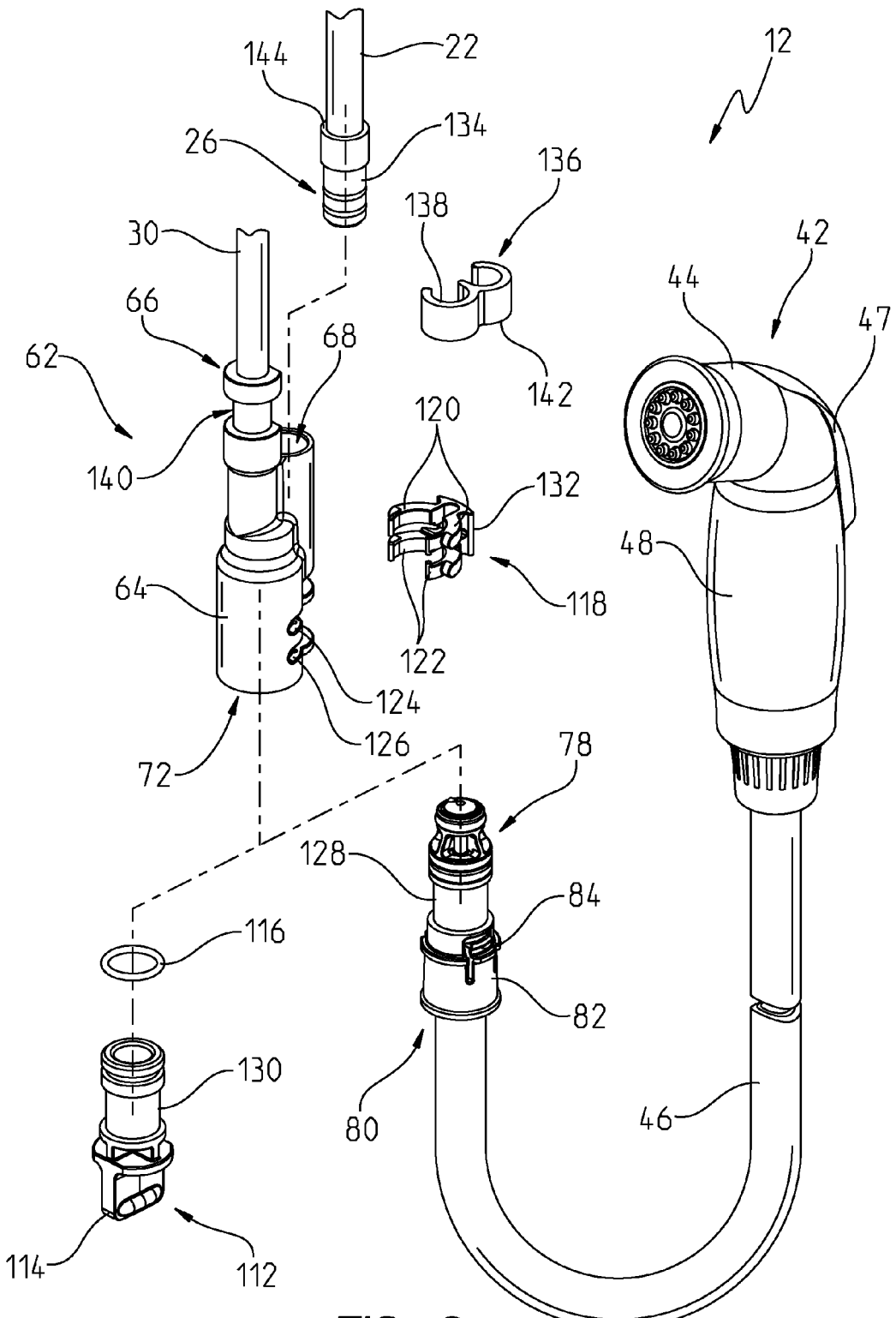
FIG. 3 is an exploded perspective view of the illustrative diverter assembly, including the diverter valve and connector of FIG. 1.
Figure 4:
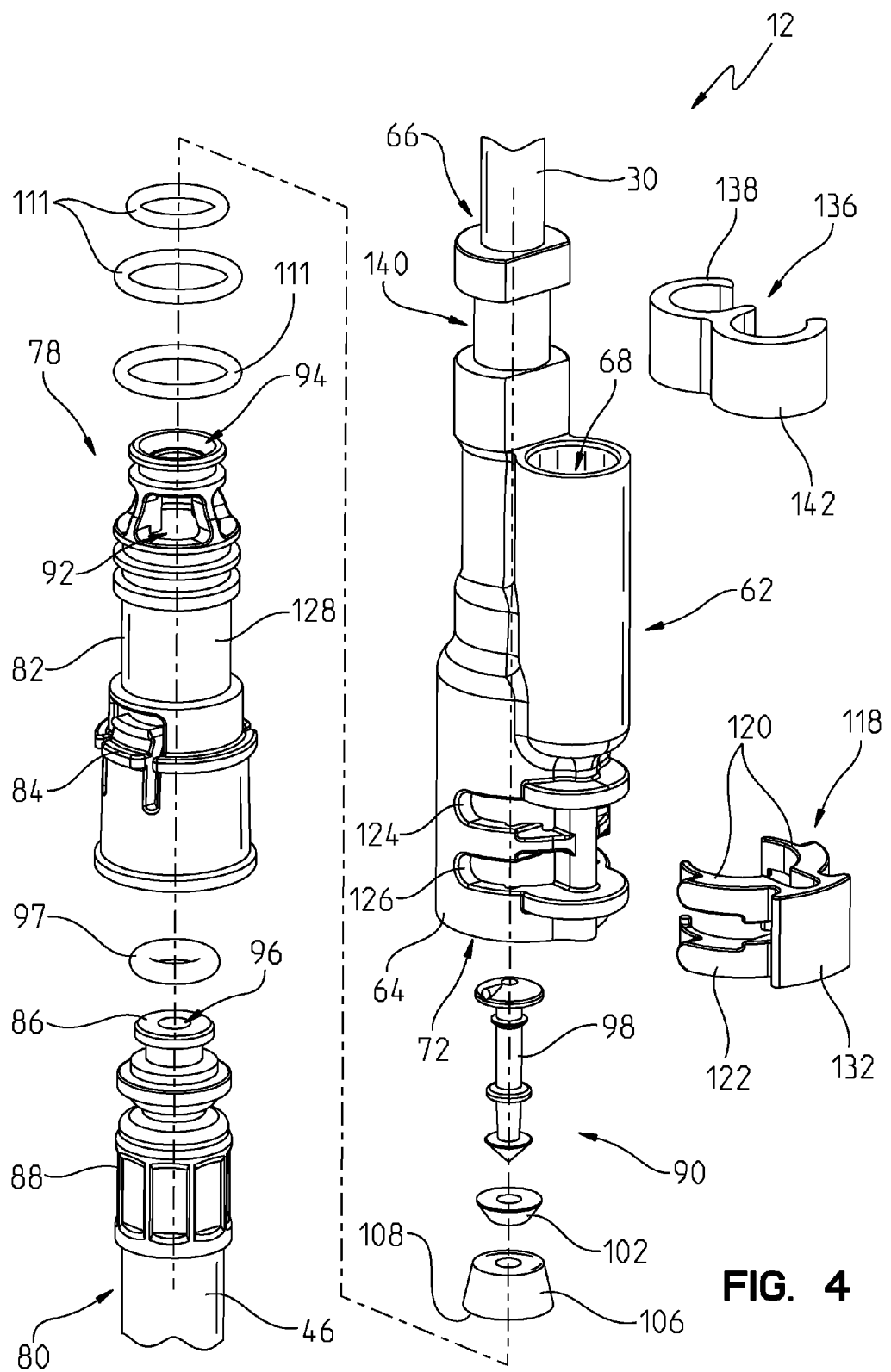
FIG. 4 is an exploded perspective view of the diverter valve and connector of FIG. 3.
Figure 5:
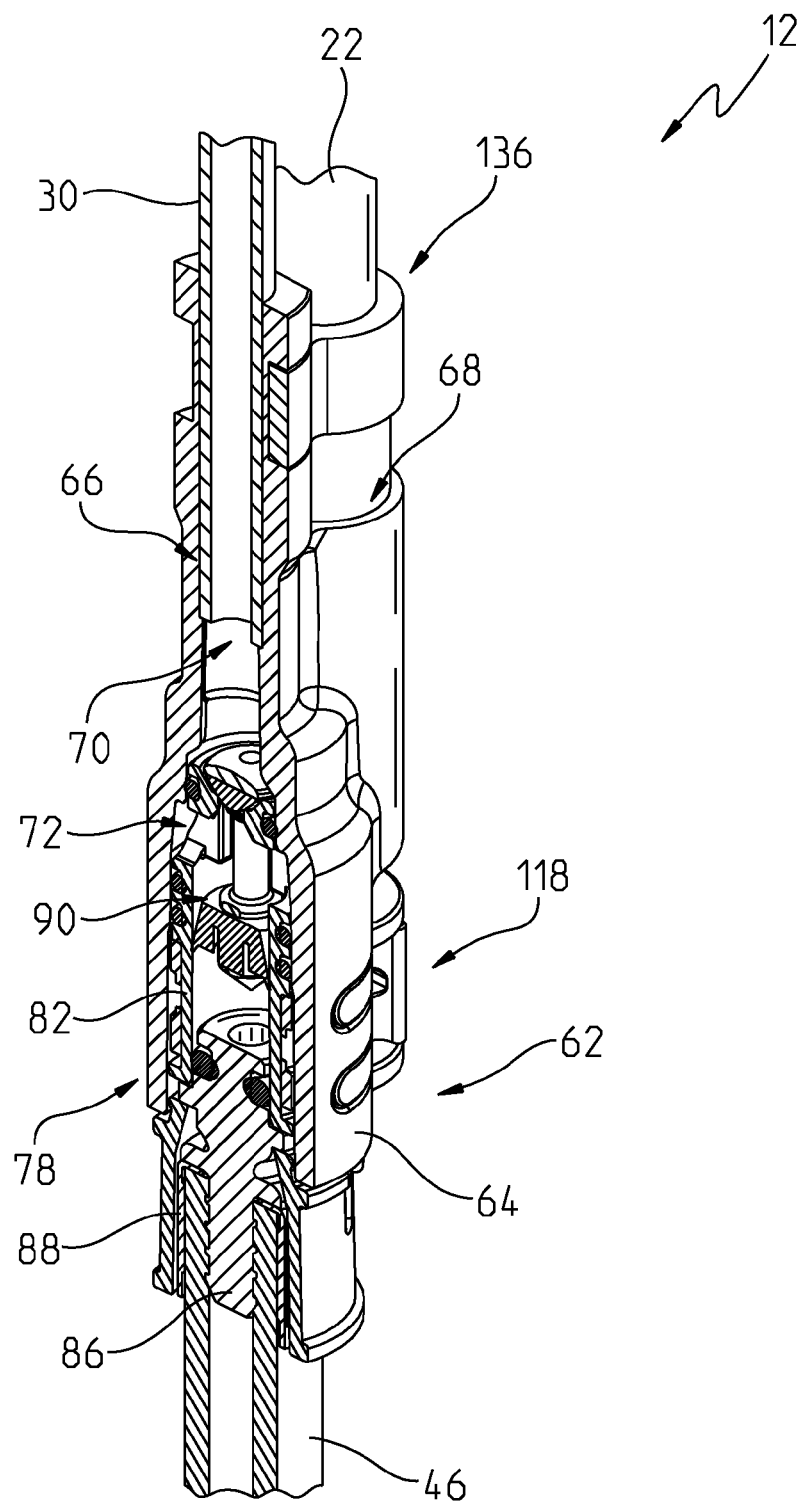
FIG. 5 is a perspective view, in partial cross-section, of the diverter valve secured within the coupler.
Figure 6:
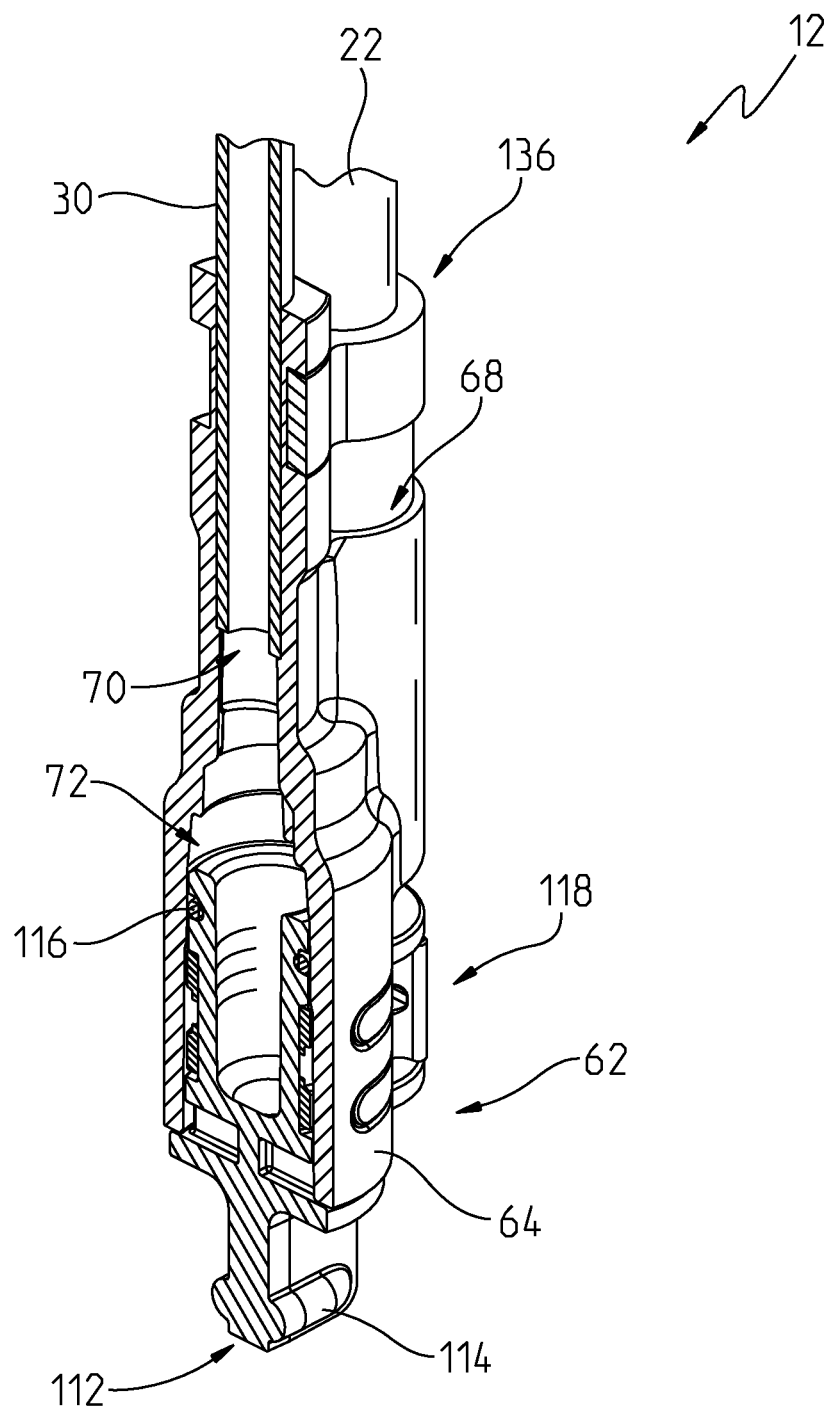
FIG. 6 is a perspective view, in partial cross-section, similar to FIG. 5 but with the diverter valve replaced with a sealing plug.
Figure 7:
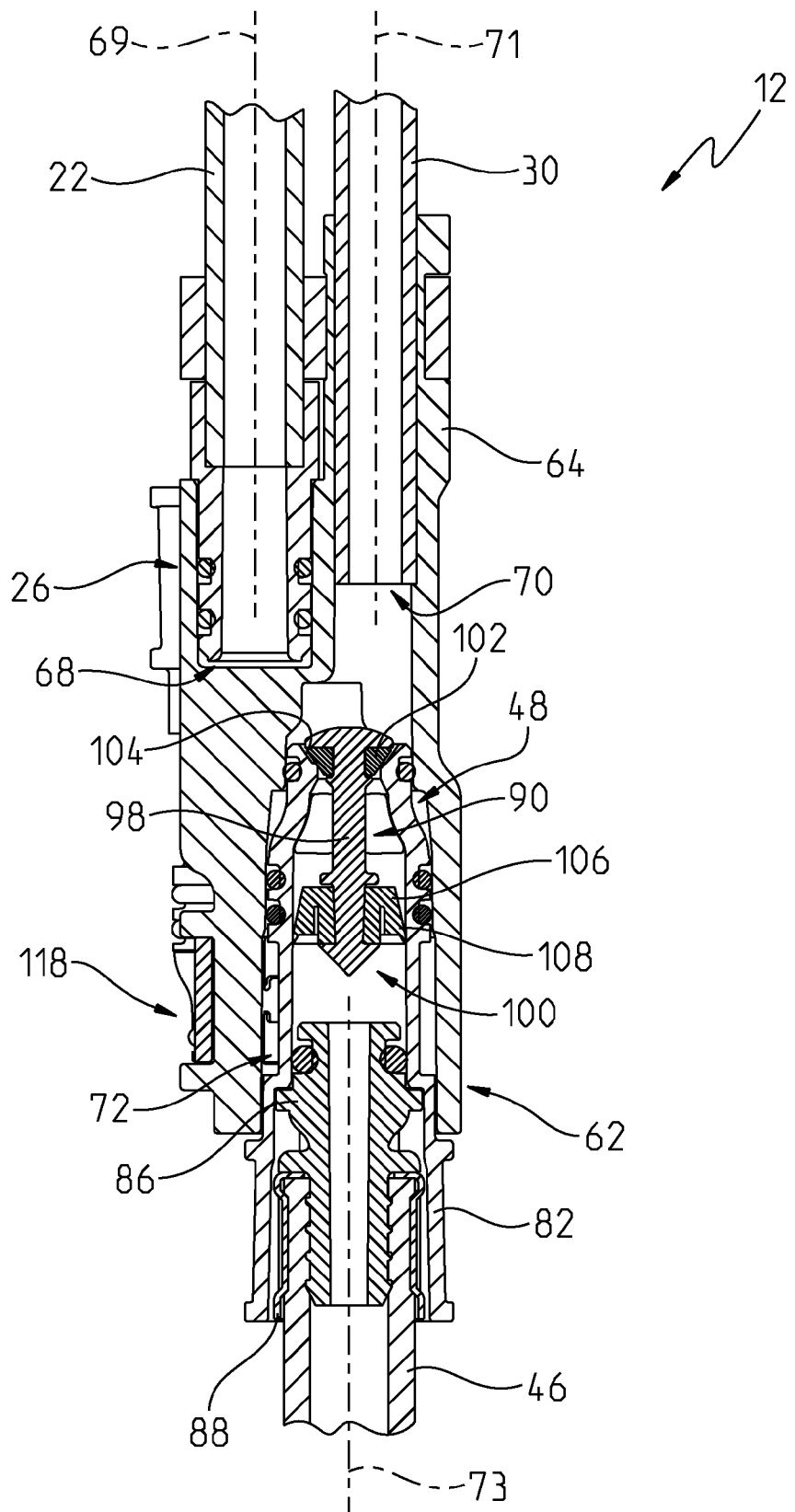
FIG. 7 is a cross-sectional view of the diverter valve secured within the connector.

With reference to FIGS. 2-4, the diverter assembly 12 illustratively includes a coupler or connector 62 having a connector housing 64 secured to an inlet end 66 of the spout outlet tube 30. More particularly, the connector housing 64 illustratively includes an inlet passage 68 coupled to the mixed water inlet tube 22, a first outlet passage 70 coupled to a first water delivery device (illustratively the outlet 31 of the delivery spout 28 as shown in FIG. 5) through the spout outlet tube 30, and a second outlet passage 72 configured to be coupled to a second water delivery device (illustratively the sprayer 44) through the sprayer outlet tube 46. Illustratively, the longitudinal axis of the inlet end 66 of the spout outlet tube 30 is coaxial with the longitudinal axis 71 of the first outlet passage 70, which, in turn, is substantially parallel to the longitudinal axis 69 of the inlet passage 68 and the longitudinal axis 73 of the second outlet passage 72 (FIG. 7).

In one illustrative embodiment, the connector housing 64 is formed by a polyethylene overmolded around the inlet end 66 of the spout outlet tube 30 and subsequently cross-linked to cross-linked polyethylene (PEX). In other words, the polyethylene of tube 30 and connector housing 64 (which have not been cross-linked or have been only partially cross-linked) are cross-linked following the overmolding process. While it is envisioned that any form of suitable cross-linking may be utilized to form the PEX of tube 30 and connector housing 64, in one illustrative embodiment the polyethylene is cross-linked by bombarding it with electromagnetic (gamma) or high energy electron (beta) radiation.

While the precise composition of the tube 30 and overmolded connector housing 64 are not required to be of any specified polymer, in general, there are several guidelines which are applicable in the practice of the illustrative embodiment. It is of course, recognized that the precise operating conditions utilized in the overmolding process are well-known in the art and are specific to each molded polymer. It is well within the skill of the art to determine the applicable conditions which will result in the appropriate overmolded connector housing 64 and tube 30. The tube 30 and connector housing 64 may be a thermoplastic or a thermoset. Illustratively, the polymer overmolded connector housing 64 should be capable of forming a leak-proof bond, either chemical or physical, with the polymer of the tube 30.

The combination of polymers of the tube 30 and the connector housing 64 illustratively satisfy at least two simultaneous conditions. First, the tube 30 illustratively does not soften and begin melt flow to the point where they lose structural integrity and second, the overmolded connector housing 64 is illustratively capable of forming an essentially leak-proof interface with the plastic conduit, preferably through either a chemical and/or physical bond between the underlying plastic and the overmolded plastic. According to the illustrative embodiment, the tube 30 is capable of maintaining structural integrity during the overmolding conditions during which the overmolded polymer is in melt flow.

While using polymer compositions which have differing softening points is one way to achieve the above objectives, there are alternatives, one of which would include the use of two compositions which have the same softening point, but which are of different thickness. Through manipulation of the time, temperature and pressure conditions experienced during the molding operation, the tube 30 would not experience melt flow, even though it had a similar softening point or range. It is also possible that through the incorporation of various additives in the polymeric compositions, e.g., glass fibers, heat stabilizers, anti-oxidants, plasticizers, etc., the softening temperatures of the polymers may be controlled.

In an illustrative embodiment of the invention, the composition of the overmolded connector housing 64 will be such that it will be capable of at least some melt fusion with the composition of the tube 30, thereby maximizing the leak-proof characteristics of the interface between the tube 30 and overmolded connector housing 64. There are several means by which this may be effected. One of the simplest procedures is to insure that at least a component of the tube 30 and that of the overmold connector housing 64 is the same. Alternatively, it would be possible to insure that at least a portion of the polymer composition of the tube 30 and that of the overmold connector housing 64 is sufficiently similar or compatible so as to permit the melt fusion or blending or alloying to occur at least in the interfacial region between the exterior of the tube 30 and the interior region of the overmold connector housing 64. Another manner in which to state this would be to indicate that at least a portion of the polymer compositions of the tube 30 and the overmold connector housing 64 are miscible.

With reference to FIGS. 3-5, a diverter valve 78 is secured to the inlet end 80 of the sprayer tube 46. More particularly, a diverter housing 82 is illustratively coaxially positioned relative to the sprayer tube 46. A pair of spring biased tabs 84 secure the diverter housing 82 to an end fitting 86 which, in turn, is secured to the sprayer tube 46 by a metal ferrule 88 crimped or swaged in place. A valve member 90 is received within the diverter housing 82 and is configured to move relative thereto to control the flow of water from an inlet port 92 to first and second outlet ports 94 and 96. An o-ring 97 forms a seal between the end fitting 86 and the diverter housing 82.

Figure 8A:
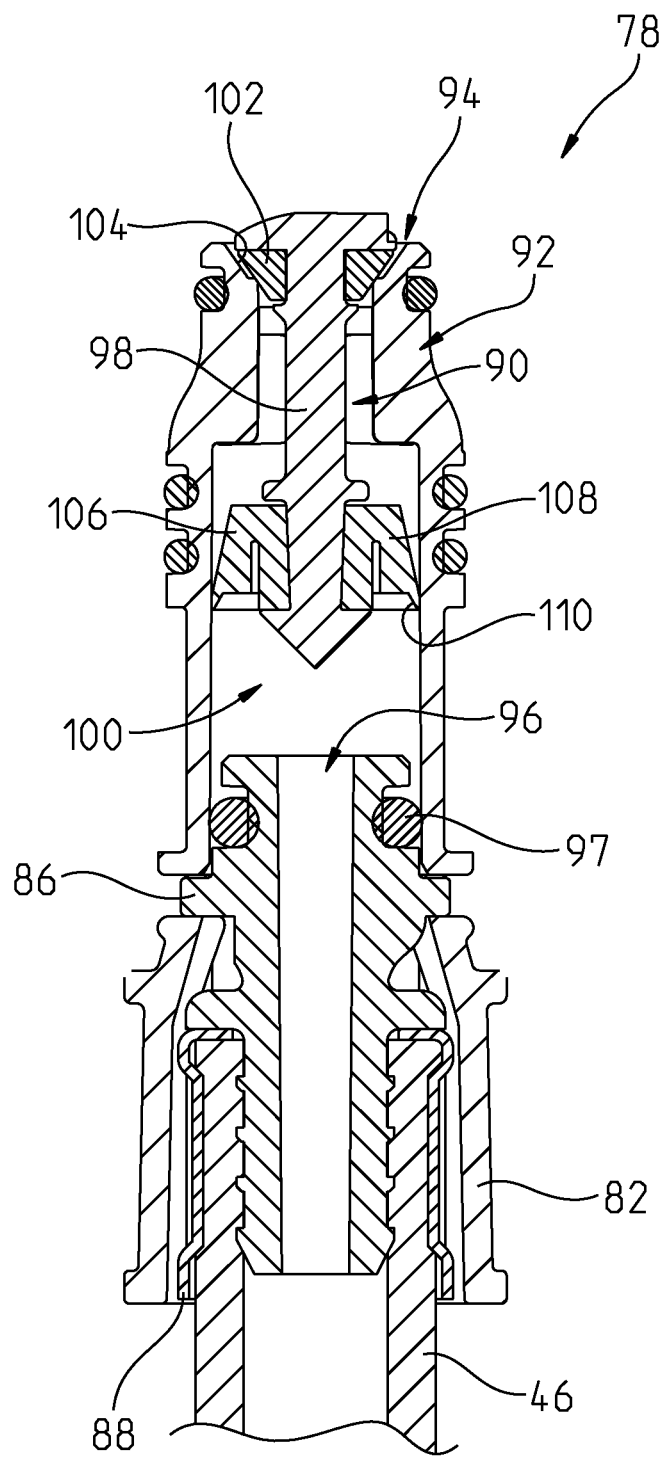
FIG. 8A is a detailed cross-sectional view of the diverter valve of FIG. 7, with the valve member in a rest position.
Figure 8B:
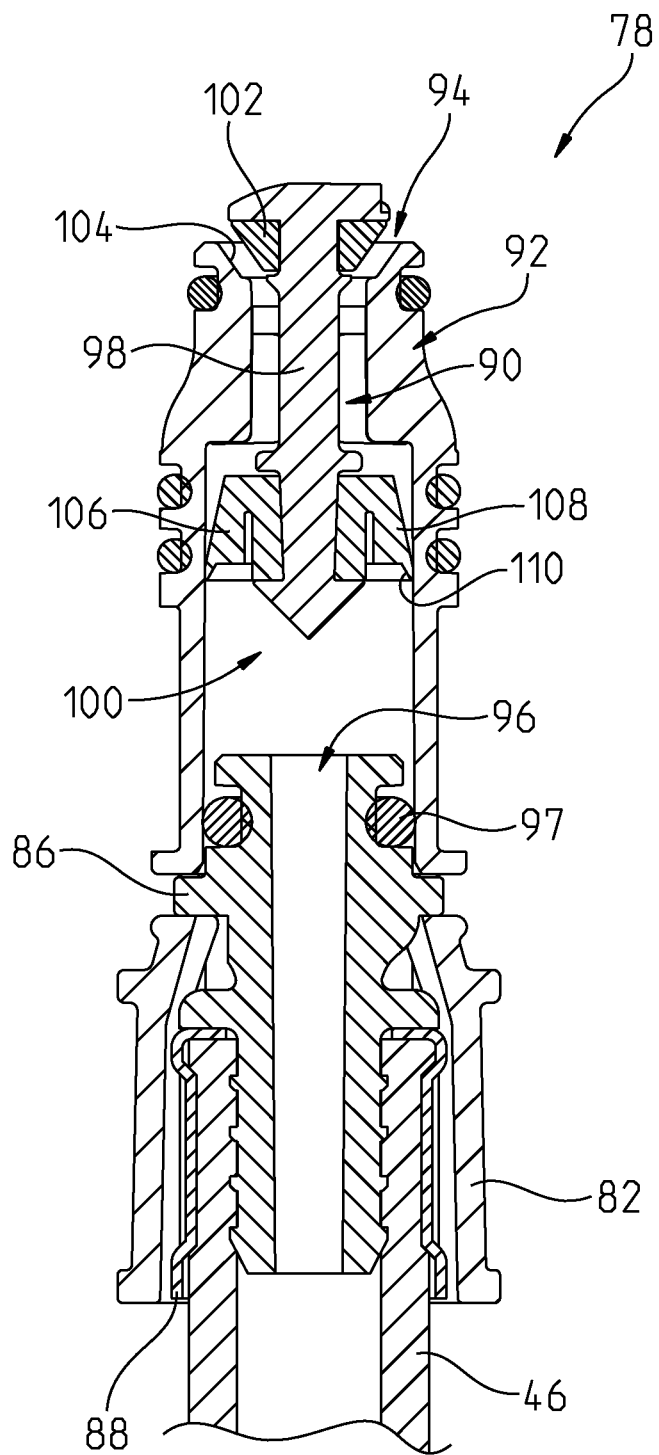
FIG. 8B is a detailed cross-sectional view similar to FIG. 8A, with the valve member in a spout delivery position.
Figure 8C:
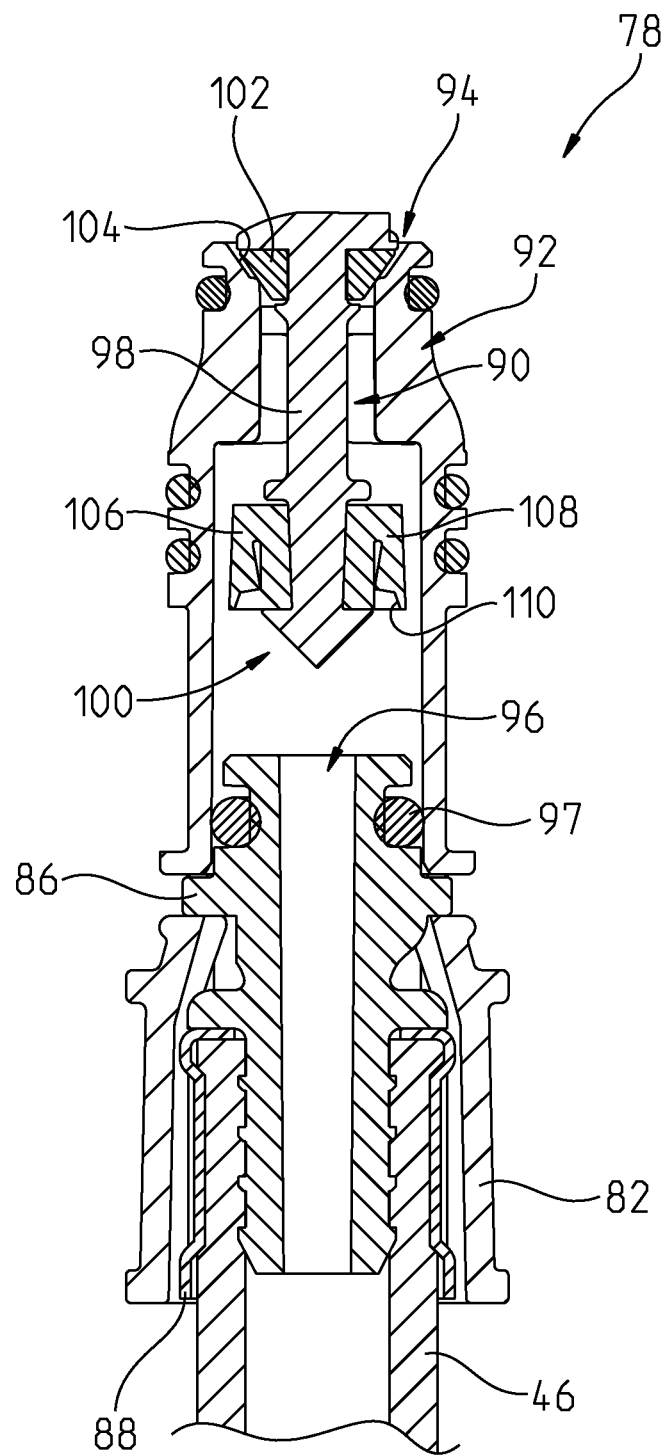
FIG. 8C is a detailed cross-sectional view similar to FIG. 8A, with the valve member in a sprayer delivery position.

The valve member 90 of the diverter valve 78 includes a poppet or stem 98 movably supported within a chamber 100 fluidly connecting the inlet port 92 to the outlet ports 94 and 96. The stem 98 supports a first seal 102 configured to seal against a first seat 104 defined by the diverter housing 82 and prevent fluid flow from the inlet port 92 to the first outlet port 94. The stem 98 also supports a second seal 106, illustratively including a lip or skirt 108, configured to seal against a second seat 110 defined by the diverter housing 82 and prevent fluid flow to the second outlet 96. As further detailed herein, the valve member 90 may operate in a known manner in response to differential water pressure changes wherein FIG. 8A shows the valve member 90 in a rest position, FIG. 8B shows the valve member 90 in a spout delivery position, and FIG. 8C shows the valve member 90 in a sprayer delivery position.

In the illustrative embodiment, the diverter valve 78 is configured to be slidably received within the second outlet passage 72 of the connector housing 64 for use with a faucet assembly 10 including sprayer assembly 42, thereby defining a multiple water outlet configuration. The diverter housing 82 is dimensioned so as to slidably pass through the conventional mounting shank 52 configured to support the sprayer 44. Illustratively, the diverter housing 82 is asymmetric to facilitate passage through the mounting shank 52 and receipt within the second outlet passage 72 of the connector housing 64. In the illustrative embodiment of FIG. 2, the outer diameter ("od") of the diverter housing 82 is less than about 0.80 inches for slidably passing through the inner diameter ("id") defining the passageway 54 of the deck mounting shank 52. O-rings 111 provide a seal between the diverter housing 82 and the connector housing 64.

When a sprayer assembly 42 is not desired, thereby defining a faucet assembly 10 having a single water outlet configuration, the diverter valve 78 is replaced with a cap or sealing plug 112 including a handle portion 114 and supporting an o-ring 116 to provide a seal between the plug 112 and the connector housing 64. As such, water is prevented from flowing through the second outlet passage 72. In both the spray (multiple water outlet) and non-sprayer (single water outlet) configurations of the faucet assembly 10, a coupler, illustratively a retaining clip 118 alternatively secures the diverter valve 78 and plug 112 within the connector housing 64. The clip 118 includes two pairs of biased arms 120 and 122 configured to pass through slots 124 and 126 in the connector housing 64 and to be alternately received within grooves 128 and 130 formed within the diverter housing 82 and the plug 112, respectively. The clip 118 also includes a handle 132 for manipulation by a user.

The outlet end 26 of the mixed water inlet tube 22 includes a fitting 134, illustratively formed of a polyethylene overmolded on the outlet end 26 and subsequently cross-linked to form PEX. The fitting 134 is configured to be received within the inlet passage 68 of the connector housing 64. A retaining clip, illustratively swing clip 136, couples the fitting 134 to the connector housing 64. The swing clip 136 includes a first clip portion 138 retained within a groove 140 of the connector housing 64, and a second clip portion 142 configured to cooperate with an edge 144 of the fitting 134. The first clip portion 138 is restrained from axial movement, but is free to rotate, such that the second clip portion 142 may be rotated into and out of engagement with the mixed water inlet tube 22.

Figure 9:
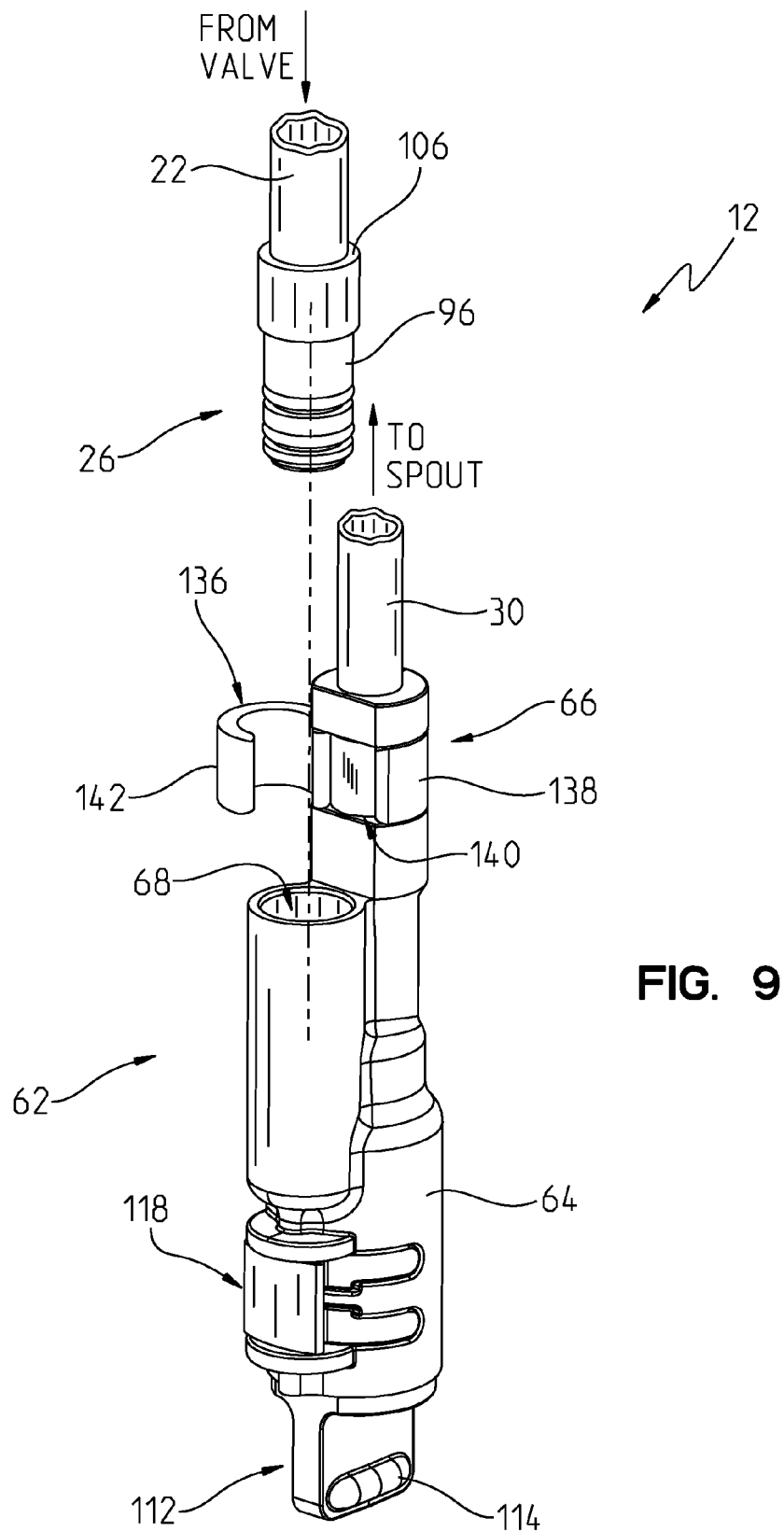
FIG. 9 is a perspective view of the connector of FIG. 1, showing the inlet tube removed from the inlet passage, the spout tube received within the first outlet passage, and the sealing plug received within the second outlet passage.
Figure 10:
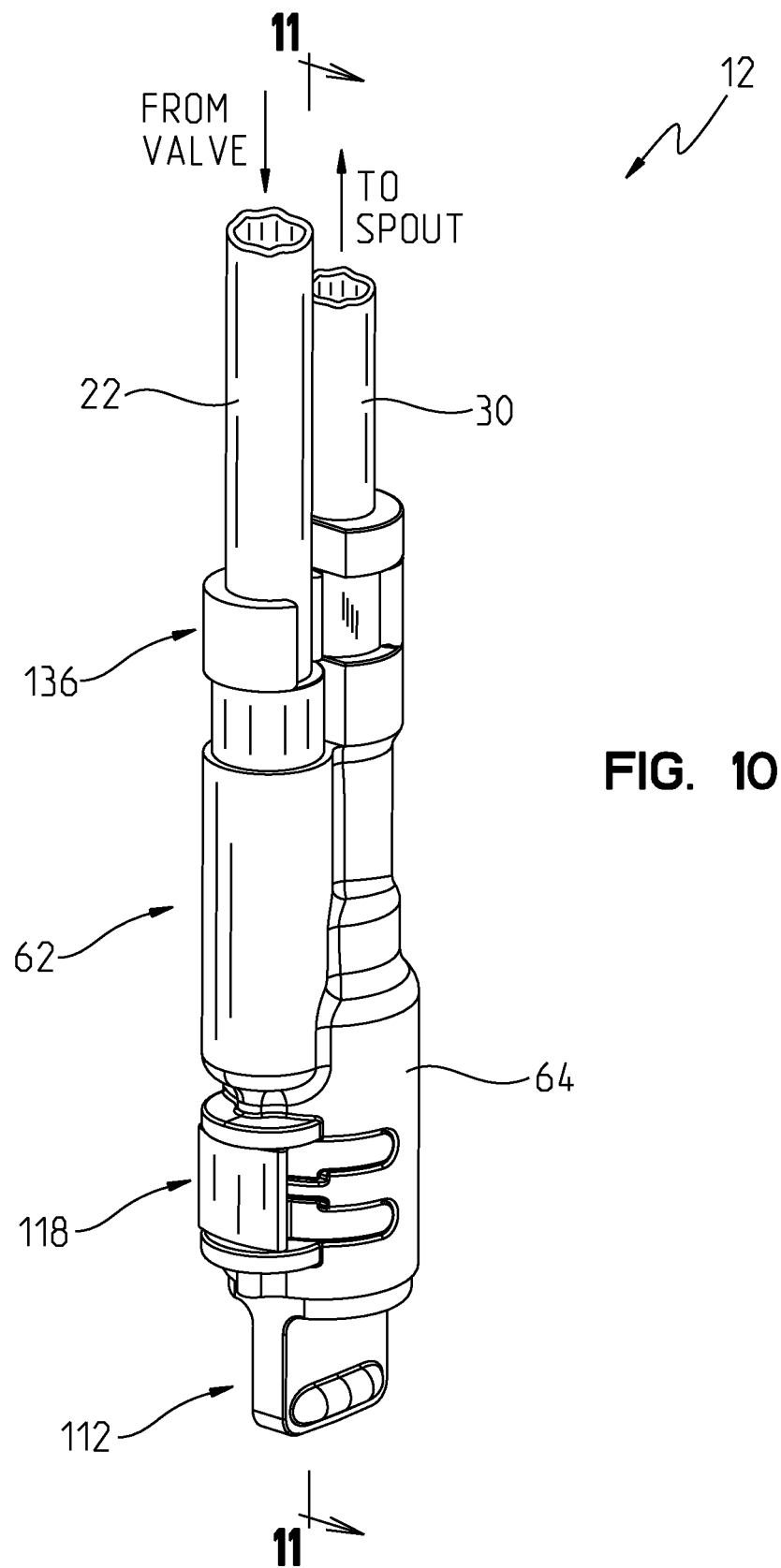
FIG. 10 is a perspective view similar to FIG. 9, showing the inlet tube received within the inlet passage of the connector and secured through a retaining clip.
Figure 11:
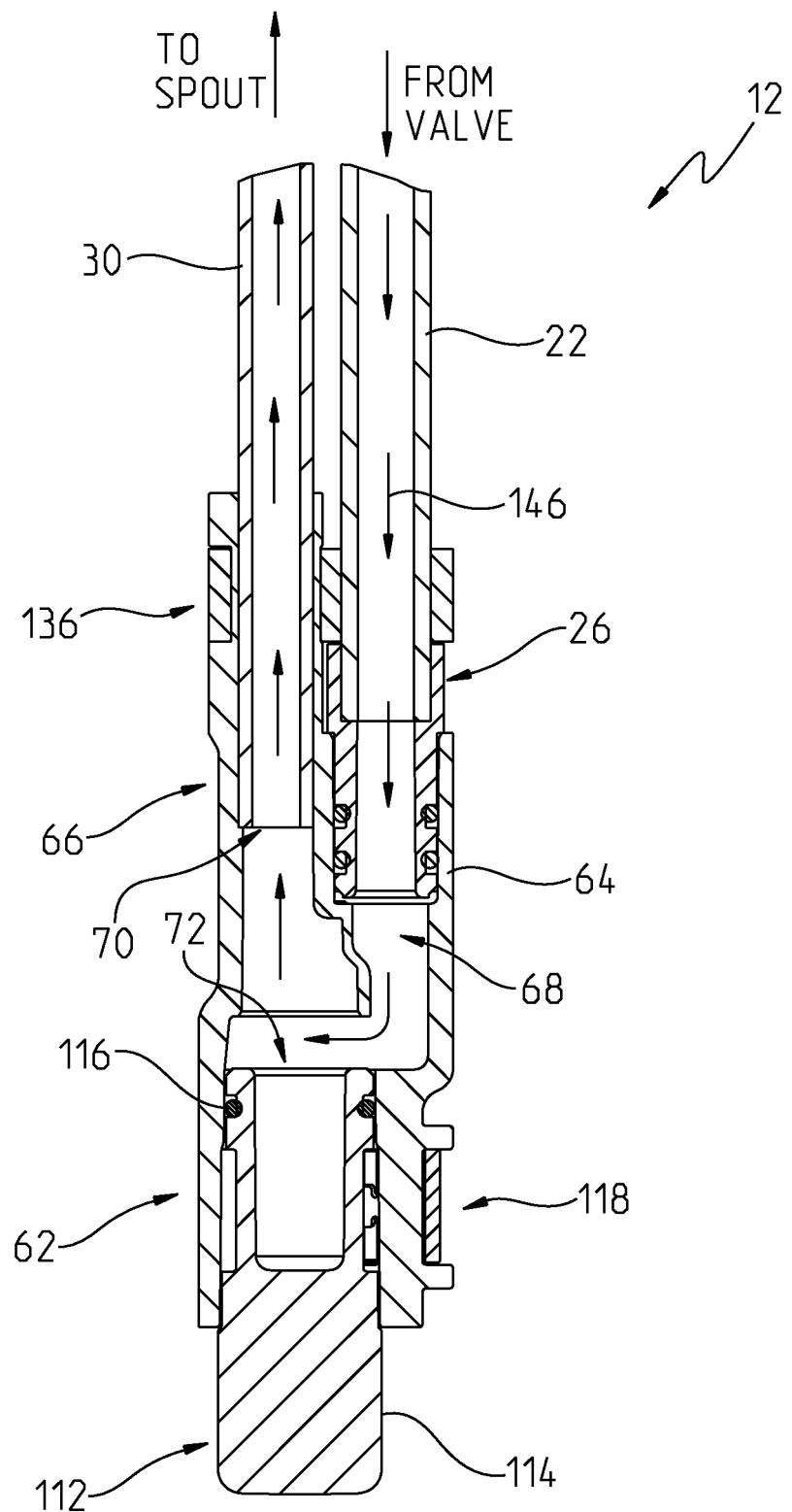
FIG. 11 is a cross-sectional view taken along line 11-11 of FIG. 10.
Figure 12:
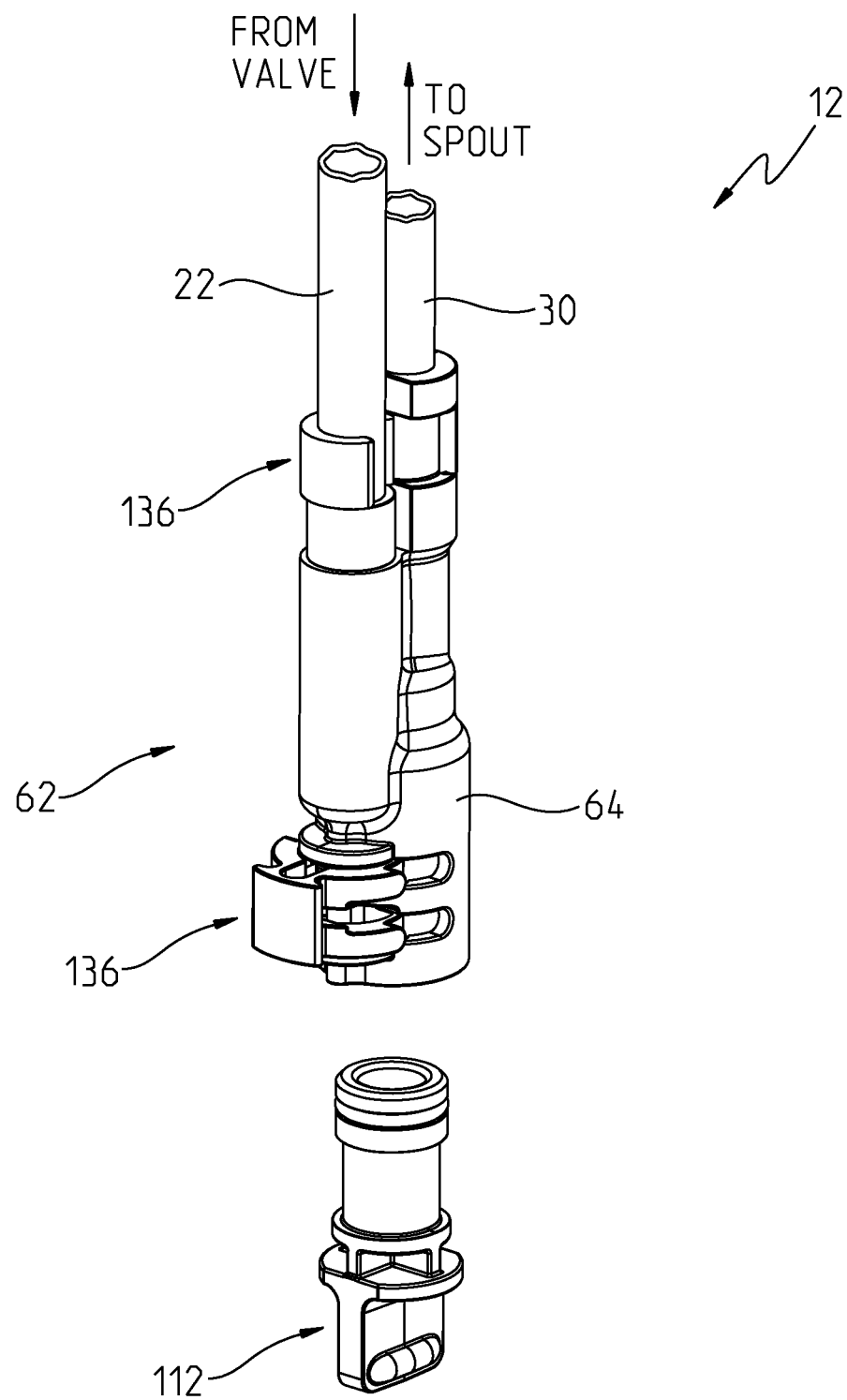
FIG. 12 is a perspective view similar to FIG. 9, showing the sealing plug removed from the second outlet passage.
Figure 15A:
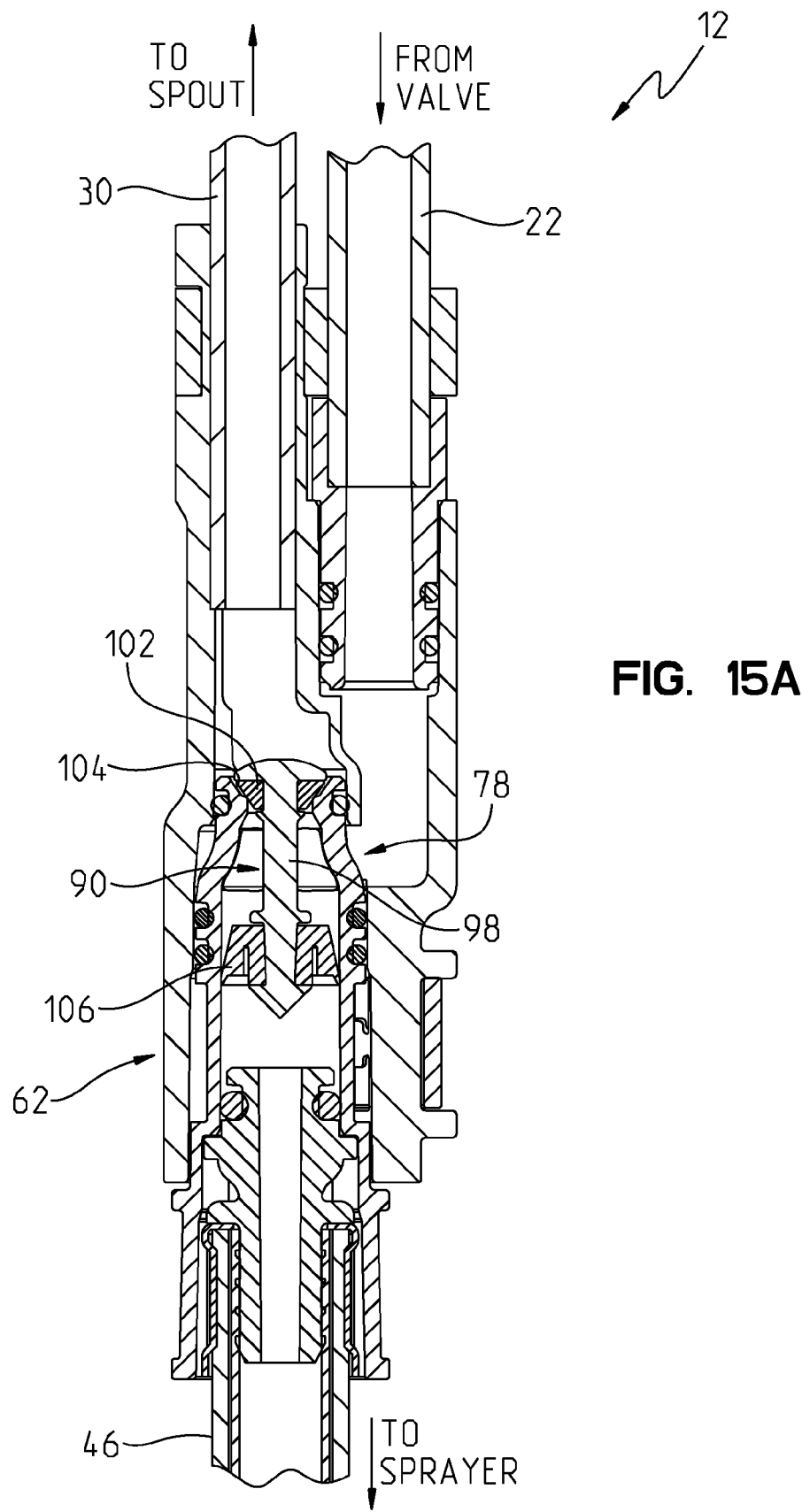
FIG. 15A is a cross-sectional view taken along line 15-15 of FIG. 14, with the diverter secured within the connector and the valve member in the rest position of FIG. 8A.

FIGS. 9-11 illustrate the diverter assembly 12 configured to operate as a non-sprayer faucet 10 and as it would leave the factory ready for installation. The path of water from the valve 20 to spout outlet tube 30 can be clearly seen by arrows 146 in FIG. 11. FIG. 12 shows the retaining clip 118 for the plug 112 in the disengaged position and the plug 112 being removed. This step may be performed at installation, or during a subsequent retrofit, to add the sprayer assembly 42 including diverter valve 78. FIG. 13 shows the diverter valve 78 of the tube 46 being inserted into the connector housing 64 on the spout outlet tube 30. As noted above, the retaining clip 118 used to secure the plug 112 is also used to secure in the diverter valve 78. FIG. 14 shows the completed diverter assembly 12 as it would appear after installation of the sprayer assembly 42. FIG. 15A shows a cross section of FIG. 14 when the valve member 90 is in the rest position of FIG. 8A (i.e. no water supplied from valve 20 to diverter valve 78). The water 146 flows in from the valve 20 into the center portion of the diverter stem 98 and either exits out the spout outlet tube 30 (FIG. 15B) or out the sprayer tube 46 (FIG. 15C), depending on whether the sprayer trigger 47 has been actuated.

Figure 15B:
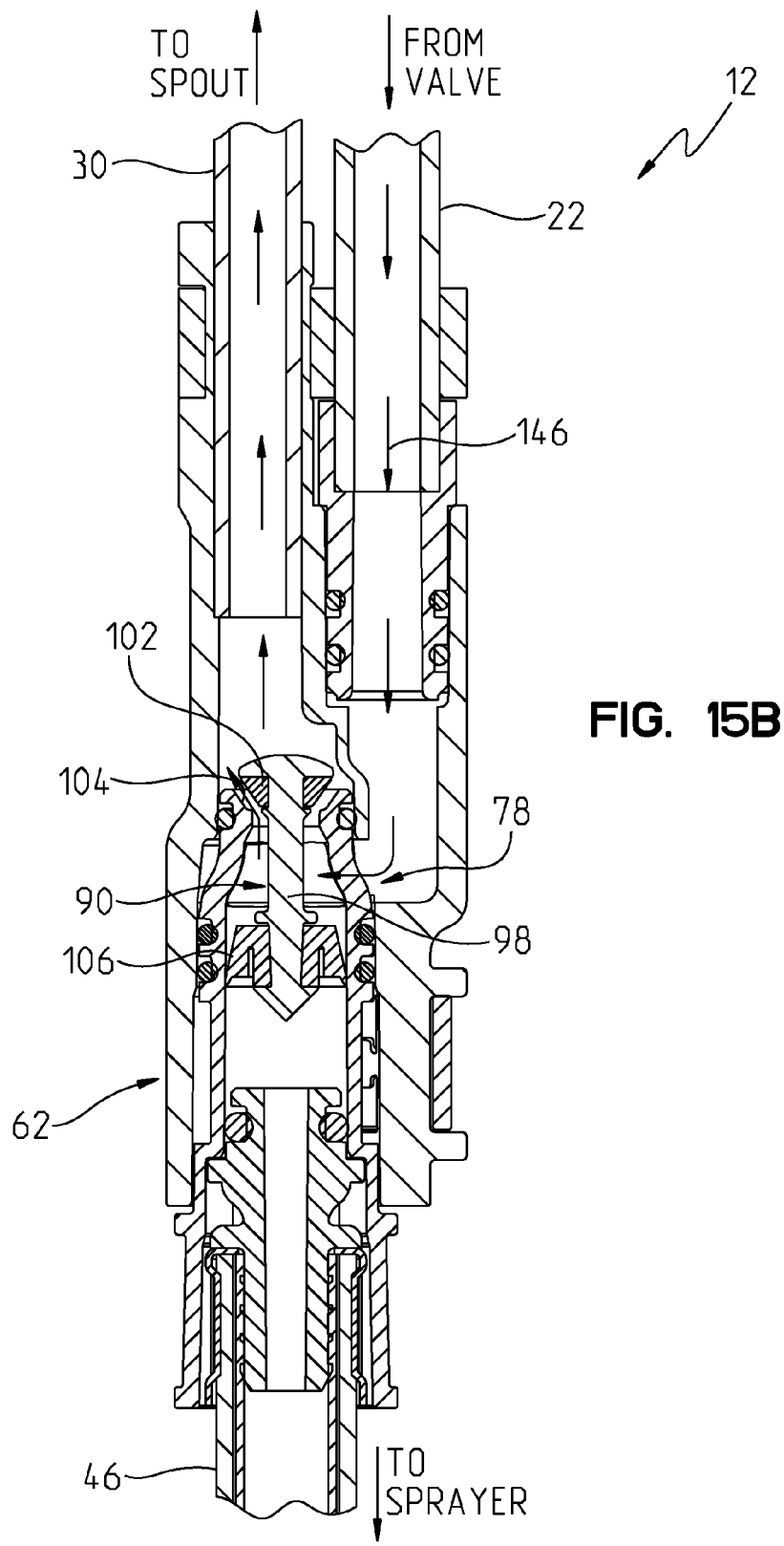
FIG. 15B is a cross-sectional view similar to FIG. 15A, with the valve member in the spout delivery position of FIG. 8B for permitting water flow from the inlet tube to the spout outlet tube.
Figure 15C:
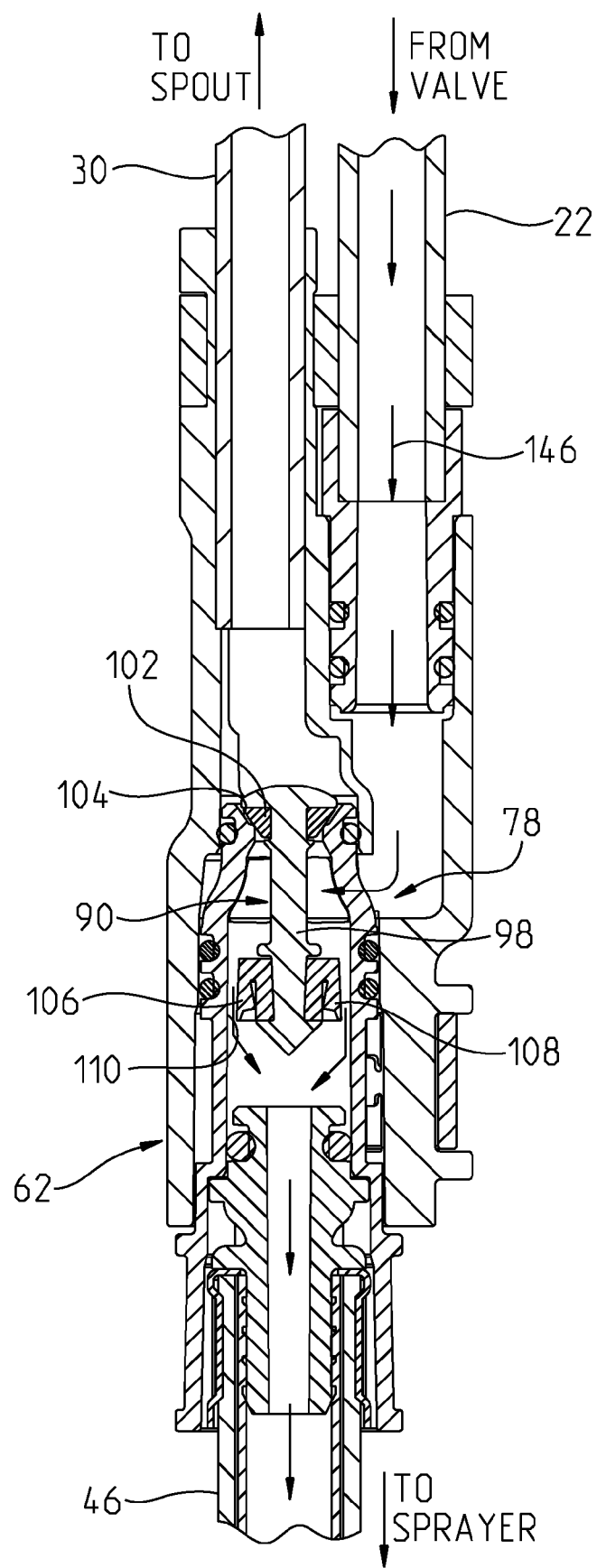
FIG. 15C is a cross-sectional view similar to FIG. 15A, with the valve member in the sprayer delivery position of FIG. 8C for permitting water flow from the inlet tube to the sprayer outlet tube.

In the operating modes of FIGS. 15B and 15C, water 146 supplied from the mixed water inlet tube 22 enters the diverter valve 78 through inlet port 92 and is received within the chamber 100 intermediate the first and second seals 102 and 106. With reference to FIGS. 8B and 15B, when the sprayer trigger 47 is deactivated, there is no substantial pressure differential across the second seal 106. However, the spout outlet tube 30 is open to atmosphere thereby creating a pressure differential across the first seal 102. The diverter valve 78 is therefore in a first or delivery spout mode of operation, where stem 98 is moved upwardly in FIGS. 8B and 15B, away from the inlet port 92. The first seal 102, in turn, disengages the seat 104 and water flows through the spout outlet tube 30.

With reference to FIGS. 8C and 15C, when the trigger 47 is actuated, pressure drops to atmosphere within the sprayer tube 46, creating a pressure differential across the second seal 106. Given the larger surface area of the second seal 106 relative to the first seal 102, the stem 98 is moved downwardly in FIGS. 8C and 15C, and the diverter valve 78 is in a second or sprayer mode of operation. As such, the first seal 102 engages the seat 104 blocking water flow to the spout outlet tube 30 while causing the skirt or lip 108 of the second seal 106 to move away from the seat 110, thereby allowing water flow to the sprayer tube 46.

The present disclosure provides a diverter valve and associated waterway that are configured to pass through a conventional opening in the sink deck. In addition, by having a connection to the delivery spout always extend below the sink, this diverter valve could facilitate the use of tubular liners for a kitchen faucet where the spout is coaxial to the valve, thus allowing for the elimination of spout o-rings and potential for contact with the spout material, which may contain materials such as lead. This configuration would also apply to other faucet configurations, including faucets where the valve and spout are located in separate mounting openings in the sink deck.

Although the invention has been described in detail with reference to certain preferred embodiments, variations and modifications exist within the spirit and scope of the invention as described and defined in the following claims.

The invention claimed is:

1. A diverter assembly for a faucet comprising:
    a connector housing including an inlet passage configured to be fluidly coupled to a water supply, a first outlet passage configured to be fluidly coupled to a first water delivery device, and a second outlet passage configured to be coupled to a second water delivery device, the second water delivery device including an outlet tube;
    a diverter valve removably coupled to the connector housing;
    the diverter valve including a diverter housing slidably received within the second outlet passage of the connector housing, and a valve member received within the diverter housing;
    the diverter housing fixed to the outlet tube of the second water delivery device such that the diverter housing and the valve member remain coupled with the outlet tube when the diverter valve is uncoupled from the connector housing, the diverter housing including an inlet port in fluid communication with the inlet passage of the connector housing, a first outlet port in fluid communication with the first outlet passage of the connector housing, and a second outlet port in fluid communication with the second outlet passage of the connector housing;
    the valve member including a first mode of operation for blocking water flow through the second outlet port and permitting water flow through the first outlet port, and a second mode of operation for permitting water flow through the second outlet port and blocking water flow through the first outlet port; and
    a coupler supported by the connector housing and configured to secure the diverter housing to the connector housing.

2. The diverter assembly of claim 1, wherein the diverter housing includes an annular lip, and the coupler comprises a retaining clip including a pair of resilient arms configured to engage the annular lip to restrain axial movement of the diverter housing relative to the connector housing.

3. The diverter assembly of claim 1, wherein the connector housing defines a longitudinal axis, and the inlet passage, the first outlet passage, and the second outlet passage extend substantially parallel to the longitudinal axis.

4. The diverter assembly of claim 1, wherein the first water delivery device comprises a delivery spout configured to be mounted to a sink deck, and the second water delivery device comprises an auxiliary dispenser configured to be supported by the sink deck in spaced relation to the delivery spout.

5. The diverter assembly of claim 4, wherein the auxiliary dispenser comprises a handheld sprayer including a trigger, and the valve member of the diverter valve changes modes in response to activation of the trigger.

6. The diverter assembly of claim 1, wherein:
    the diverter housing of the diverter valve includes a first seat and a second seat; and
    the valve member of the diverter valve includes a poppet supporting a first seal configured to engage the first seat to block water flow through the first outlet port, and a second seal configured to engage the second seat to block water flow through the second outlet port.

7. The diverter assembly of claim 1, further comprising an outlet tube in fluid communication with the first outlet passage of the connector housing and having an end fixed to the connector housing.

8. The diverter assembly of claim 7, wherein the connector housing is overmolded around the end of the outlet tube.

9. The diverter assembly of claim 7, further comprising an inlet tube in fluid communication with the inlet passage of the connector housing and having an end coupled to the connector housing.

10. The diverter assembly of claim 9, further comprising:
a retaining clip having a first portion coupled to the connector housing and a second portion coupled to the inlet tube; and
wherein the first portion of the retaining clip is rotatable relative to the connector housing, and the inlet tube includes an annular ring engageable with the second portion of the retaining clip to restrain axial movement of the inlet tube relative to the connector housing.

* * * * *